C. E. BROWN.
Improvement in Transplanters.
No. 130,893.
Patented Aug. 27, 1872.
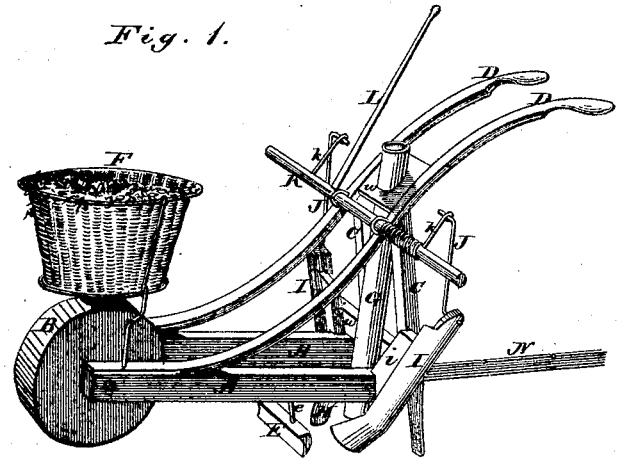
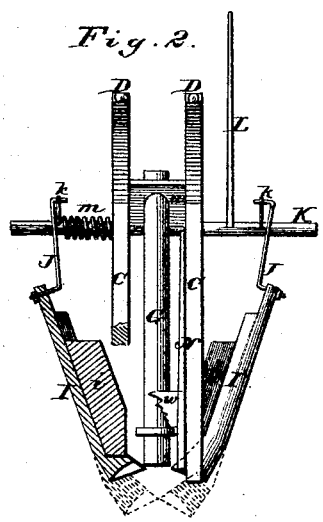
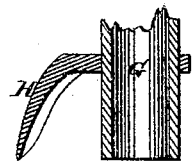
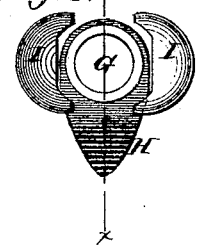
Witnesses.
Inventor.

UNITED STATES PATENT OFFICE.

CLARENCE E. BROWN, OF AMHERST, MASSACHUSETTS.

IMPROVEMENT IN TRANSPLANTERS.

Specification forming part of Letters Patent No. 130,893, dated August 27, 1872.

*To all whom it may concern:*

Be it known that I, CLARENCE E. BROWN, of Amherst, in the county of Hampshire and State of Massachusetts, have invented an Improved Transplanter; and I declare the following to be a full, clear, and exact description thereof, reference being had to the accompanying drawing forming a part of this specification, in which—

Figure 1 is a perspective view; Fig. 2, a rear elevation, a portion being shown in section; Fig. 3, a horizontal section through the guide-tube; and Fig. 4, a bottom view of the guide-tube, plow, and plungers, disconnected from the rest of the machine.

Similar letters of reference denote the same parts.

The object of this invention is to facilitate the setting out of small plants; and the invention consists in an improved machine for that purpose, constructed and operating as hereinafter set forth, said machine being also adapted for use as a planter for the purpose of planting potatoes and other seeds.

In the drawing, A is a frame consisting of two parallel horizontal beams arranged longitudinally of the machine, supported at their forward end upon a light broad-rimmed wheel, B, and at their rear end, when the machine is standing still, upon two legs, C C, which are connected and braced by cross-beams $w$ $w$. D D are handles by which the apparatus is pushed along, and F is a basket, supported in any suitable manner, for the purpose of containing the young plants or the seeds. Under the frame A, and connected thereto by means of arms $e$ $e$, is a scraper, E, which, as the machine is pushed along, removes the dry surface-soil, exposing the damper earth beneath. This scraper may be made either vertically or laterally adjustable, and may be set obliquely of the frame and removed altogether when desired. G is a tube or funnel properly supported in the frame and capable of vertical adjustment by any suitable means, its function being to guide the plants or seed as they are dropped through it, and, when transplanting, to hold the plants erect until their roots can be covered with dirt. A suitable groove or furrow is opened to receive the seed or plant, by means of a plow, H, between the tube and the scraper, said plow being capable of vertical adjustment either with the tube or on it, or altogether independent of it, as may be preferred. $i$ $i$ are inclined guides attached to the side pieces of the frame and braced by the lower cross-bar $w$, each having a dovetail tongue on its outer edge, which fits into a corresponding groove cut in the inner side of the sliding plungers I I, so as to hold them steadily and guide them in their upward and downward movement. When the plant, dropped through the tube, has been properly set in the furrow, the function of the plungers is to bring a portion of the loose earth toward it so as to cover its roots, and to compress or stamp such earth into a compact hill immediately around the stem. To this end their lower extremity is somewhat expanded and bent inward, and is made concave, as shown in Figs. 1, 2, 3, while they are adapted to be operated by means of rods J J connected to the arms $k$ $k$ of a rocking bar, K, which is worked by a lever, L, and provided with a spring, $m$, that holds them up, except when depressed by a movement of the lever. In rear of the tube is a graduated bar, N, hinged upon a pin and serving as a marker to guide the attendant in properly spacing the rows.

In setting out young plants the tube will be lowered so as to protect their leaves and stem while the earth is brought around their roots. In planting potatoes or other seed the tube should be raised far enough to be out of the way of the plungers in forming the hill.

The machine is capable of a variety of modifications in the details of construction. For example, the tube G may be funnel-shaped, and the frame may, if preferred, be made of a different form from that shown in the drawing. The plungers may be guided by passing through loops or staples instead of the dovetail tongue-and-groove arrangement, and may be depressed by a treadle instead of a hand-lever; and the opening-plow may be attached to the frame instead of being supported on the tube, as shown. All these are obvious modifications, which I regard as included within the scope of my invention.

I am aware that machines have been heretofore invented for the same purpose as this, and that in some of those machines a kind of scraper has been employed to scrape the dirt from both sides toward the plant by the movement of a lever. My machine differs from these in that the dirt is both scraped toward the plant and pressed or stamped down around it by the operation of the plungers, so that, when they are raised out of the way again, the plant is securely set in the ground. The cavities in the end of the plungers are specially adapted to the proper formation of the hill around the stem of the plant.

I claim as my invention—

1. The plungers I, constructed with the enlarged concave lower end, arranged in an inclined position on each side of the tube G, as shown, and adapted, by means of the operating mechanism described, to simultaneously scrape the earth toward the stem of the plant and stamp it down around the same, substantially as herein set forth.

2. The machine constructed as herein described—that is to say, combining the frame A C, wheel B, handles D, scraper E, plow H, guide tube or funnel G, and inclined plungers I running in guides and operated by mechanism J K L m—substantially as and for the purposes set forth.

CLARENCE E. BROWN.

Witnesses:
A. PERRY PECK,
WILLIAM LYMAN.